UNITED STATES PATENT OFFICE.

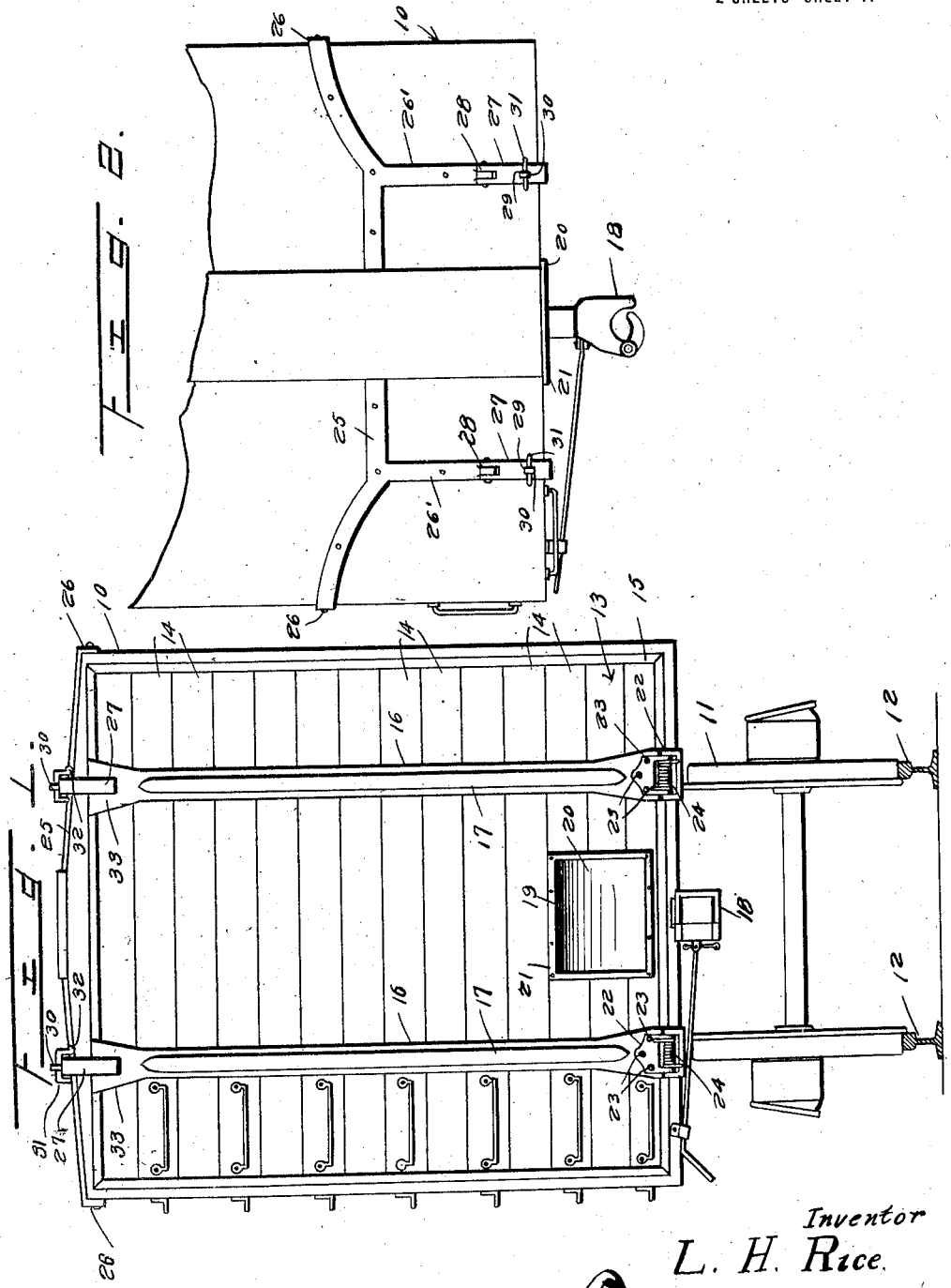

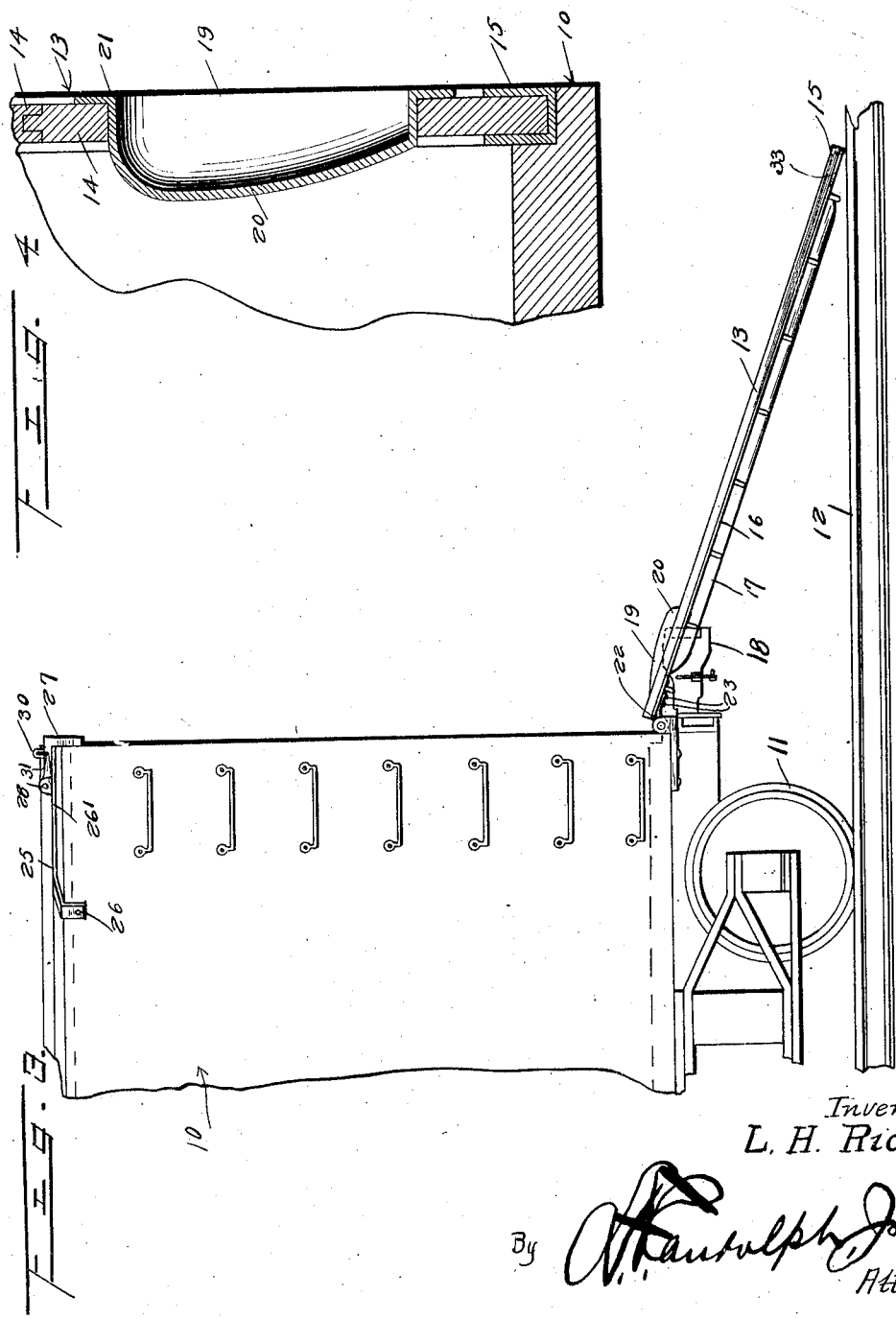

LANGLEY H. RICE, OF MEMPHIS, TENNESSEE.

RAILROAD-CAR DOOR.

1,355,693.   Specification of Letters Patent.   Patented Oct. 12, 1920.

Application filed July 11, 1919. Serial No. 309,993.

*To all whom it may concern:*

Be it known that I, LANGLEY H. RICE, a citizen of the United States, residing at Memphis, in the county of Shelby and State of Tennessee, have invented certain new and useful Improvements in Railroad-Car Doors; and I do hereby declare the following to be a full, clear, and exact description of the invention, such as will enable others skilled in the art to which it appertains to make and use the same.

My invention relates to improvements in combined drop and skid doors especially adapted for attachment to freight cars.

An important object of this invention is to provide a door adapted for attachment to one end of a car and being of a greater width than the rails on which the car is mounted whereby the door may be employed as a skid.

A further object is to provide an end door for freight cars which by reason of being of a greater width than the gage of the rails will discharge any articles of freight within the cars which may chance to fall through the door should the same become unlocked on the outside of the rails and thereby prevent damage to the rails.

A further object is to provide an end door which is possessed of great strength whereby the same may be used as a skid for unloading automobiles, heavy machinery, and other cumbersome and heavy articles of freight.

A further object is to provide an end door for freight cars having novel means for locking the same.

Other objects and advantages of the invention will be apparent during the course of the following description.

In the accompanying drawings forming a part of this application and in which like numerals are employed to designate like parts throughout the same, Figure 1 is an end elevation of a freight car having my improved door applied thereto, Fig. 2 is a fragmentary plan view of the same, Fig. 3 is a fragmentary side elevation of the same, and, Fig. 4 is a longitudinal section through the door.

In the drawings wherein for the purpose of illustration is shown a preferred embodiment of my invention, the numeral 10 designates the body of a car provided with the usual running gear 11 mounted on tracks 12 of the usual gage.

A door generally designated by the numeral 13 is composed of a plurality of horizontally extending tongue and grooved members 14 having their outer sides bound by a metallic binding strip 15 which as indicated in Fig. 4 is U-shaped in cross section. A pair of longitudinally extending spaced parallel metallic bracing bars 16 are secured to the outer side of the door and are provided with ribs 17 which serve to reinforce the same. The bracing bars 16 extend for the full length of the door and are disposed above the rails 12 and in line with the same, whereby when the door is lowered all strain on the door will be imparted to the braces.

The usual coupling device 18 extends outwardly from the end of the car and extends through a light concavity 19 in the lower portion of the door when the door is lowered. A cover plate 20 having an attaching flange 21 extends over and to the opening for closing the same. When elevated or closed the closure plate 20 of the door projects slightly into the car and does not interfere to an appreciable extent with the contents of the same.

A pair of hinges 22 have one of their plates attached to the lower portions of the braces 16 by relatively stout bolts 23. The bolts 23 are also extended through the lower portion of the door and serve as a means of attaching the braces 16 to the door. The lower plates of the hinges 22 extend under the car and are secured to the same. Stout coil springs 24 are arranged on the pivot pins of the hinges and serve to retain the door normally closed.

The springs 24 exert a pressure upon the door which tends to swing the same from an open to a closed position.

A metallic strap 25 is secured to the top of the car by depending flanges 26. The attaching strap 25 is provided with a pair of spaced parallel arms 26′ having flat metallic latch plates 27 horizontally pivoted thereto as indicated at 28. The latch plates 27 are L-shaped in side elevation and are provided with openings 29 for the reception of keepers 30. Locking pins 31 extend through the keepers 30 and have their ends angularly disposed for retaining the pins in position. One end portion of each locking pin 31 is weighted as indicated at 32 for retaining the arms of the locking pins in engagement with the sides of the latch plates.

The arms of the L-shaped latch plates 27 extend over and engage the outer sides of the door for retaining the same closed.

In the use of my invention, the door is held in a closed position by the latch plates 27 engaging the outer side of the door. When it is desired to load or unload the car, the door is lowered and the flared outer end portions 33 of the brace members 16 engaged with the rails. By reason of the fact that the door is wider than the gage of the rails any articles of freight which may chance to fall out of the door will necessarily be discharged outwardly of the rails and thereby prevent damage to the rails when subsequent cars pass over the rails.

While I have shown and described the preferred embodiment of my invention, it is understood that such minor changes in arrangement and construction of parts may be made as will remain within the spirit of the invention and the scope of the appended claims.

Having thus described my invention, what I claim is:—

1. A freight car door including a body hinged at its lower edge to the car, spaced braces secured to the outer side of the body and extending the full length of the same and lying in the same vertical planes as those in which the wheels of the car lie.

2. A freight car door including a body hinged at its lower side to the car, spaced braces secured to the outer side of the body and extending the full length of the same and lying in the same vertical planes as those in which the wheels of the car lie, said bars having their outer end portions flared for engagement with the track rails.

3. A freight car door including a body hinged at its lower side to the car, spaced braces secured to the outer side of the body and extending the full length of the same and lying in the same vertical planes as those in which the wheels lie and a recessed cover plate mounted upon the body in the vicinity of its hinged edge and lying between the bars.

In testimony whereof I affix my signature in presence of two witnesses.

LANGLEY H. RICE.

Witnesses:
 JULIA MAI LOCKERT,
 ESSIE V. BAYETT.